(12) United States Patent
Chisholm

(10) Patent No.: US 8,022,135 B2
(45) Date of Patent: Sep. 20, 2011

(54) EMBEDMENT CASTING COMPOSITION

(75) Inventor: Michael Stephen Chisholm, Stockton-on-Tees (GB)

(73) Assignee: Lucite International UK Limited, Hampshire (GB)

(*) Notice: Subject to any disclaimer, the term of this patent is extended or adjusted under 35 U.S.C. 154(b) by 553 days.

(21) Appl. No.: 11/921,100

(22) PCT Filed: May 24, 2006

(86) PCT No.: PCT/GB2006/001894
§ 371 (c)(1),
(2), (4) Date: Jan. 25, 2008

(87) PCT Pub. No.: WO2006/125976
PCT Pub. Date: Nov. 30, 2006

(65) Prior Publication Data
US 2009/0131579 A1    May 21, 2009

(30) Foreign Application Priority Data

May 27, 2005 (GB) .................................... 0510865.9
Dec. 23, 2005 (GB) .................................... 0526248.0

(51) Int. Cl.
*C08L 33/06* (2006.01)
*C08F 20/06* (2006.01)

(52) U.S. Cl. ................. 524/560; 526/317.1; 526/319

(58) Field of Classification Search ................ 526/317.1, 526/319; 524/560
See application file for complete search history.

(56) References Cited

U.S. PATENT DOCUMENTS

| | | | | |
|---|---|---|---|---|
| 2,934,509 A | * | 4/1960 | Crissey et al. ................ 524/141 |
| 2,934,510 A | * | 4/1960 | Crissey et al. ................ 524/294 |
| 2,949,383 A | * | 8/1960 | Blake ............................. 428/414 |
| 3,175,989 A | * | 3/1965 | Cannon et al. ................ 524/296 |
| 4,558,084 A | * | 12/1985 | Quis et al. ..................... 524/294 |
| 5,242,968 A | * | 9/1993 | Minghetti et al. ............ 524/430 |

FOREIGN PATENT DOCUMENTS

| | | | |
|---|---|---|---|
| EP | 0 121 398 A1 | | 10/1984 |
| EP | 0 786 479 A | | 7/1997 |
| GB | 807 914 A | | 1/1959 |
| GB | 848 816 A | | 9/1960 |
| GB | 917 418 A | | 2/1963 |
| GB | 1 114 133 A | | 5/1968 |
| GB | 1114133 A | * | 5/1968 |
| JP | 59 182810 A | | 10/1984 |
| JP | 61 271302 A | | 12/1986 |
| JP | 63-280710 | | 11/1988 |
| JP | 2003-020436 | | 1/2003 |
| JP | 2003-212906 | | 7/2003 |
| JP | 2005-162820 | | 6/2005 |
| JP | 2005162820 A | * | 6/2005 |

* cited by examiner

*Primary Examiner* — Michael M Bernshteyn

(74) *Attorney, Agent, or Firm* — Venable LLP; Michael A. Sartori; Keith G. Haddaway

(57) ABSTRACT

An embedment casting composition and a process of embedding a specimen in an acrylic polymer matrix is described. The composition comprises an acrylic copolymer and a suitable solvent. The acrylic copolymer is derived from 80-99% w/w methyl methacrylate, 0.1-10% w/w of a $C_3$-$C_{10}$ olefinically unsaturated acid co-monomer selected from carboxylic, phophonic, sulphonic or phosphinic acids and 0-10% w/w other suitable monomers and/or additives. A process of embedding a specimen in an acrylic polymer matrix, a cast of an embedded metal specimen, the use of an embedment composition for coating a specimen prior to an embedment coating process and use of an embedment composition as the copolymer resin component of an embedment slurry are also described.

22 Claims, No Drawings

EMBEDMENT CASTING COMPOSITION

The present invention relates to an embedment casting, in particular but not exclusively, to an embedment casting composition and a process of embedding a specimen in an acrylic polymer matrix.

Poly(methyl methacrylate) (PMMA) bead resins are routinely used in embedment casting applications. The method employed is to mix roughly equal parts of PMMA bead resin and methyl methacrylate (MMA) monomer. The MMA begins to dissolve the PMMA and a viscous slurry is formed. This is poured into a mould whereupon it continues to harden and is eventually able to support the weight of an embedment specimen. The embedment is placed on top of the first layer of PMMA/MMA mixture and the mould is filled with another layer of the PMMA/MMA slurry. The mould is then typically placed in an autoclave where the slurry undergoes polymerisation under heat and pressure. After polymerisation, the contents of the autoclave are cooled, and the casting typically undergoes further processing. Usually such further processing includes machining, sanding and polishing the casting to a clear, crystal-like finish.

A wide range of specimens can be embedded in PMMA by the above method. However, metal and hard mineral articles pose particular problems. It is found that these often debond from the surrounding polymer and this mars the appearance of the final casting by causing the embedded article to have a "silvered" appearance where the metal and PMMA have debonded. Without being bound by any particular theory, the cause of this debonding may be due to the difference in coefficient of thermal expansion between the specimen and PMMA. On cooling the cured moulding following polymerisation, the metal article probably shrinks to a greater extent than PMMA. This leads to a build-up of interfacial stress and eventual debonding of metal from polymer. Ways to prevent "silvering" have been proposed in the past, e.g., addition of plasticizer or methacrylic acid (MAA) to the monomer/solvent system of the embedment casting composition but these are not wholly successful and can lead to other problems. For instance, the plasticizers may reduce the surface hardness of the cured casting and use of monomer acids, such as MAA, can lead to discoloration of some metals.

Surprisingly, it has been found that copolymerising a relatively small amount of an unsaturated acid monomer into the polymer bead resin has the effect of preventing "silvering" in the final cured casting. This benefit can also be achieved whilst avoiding drawbacks observed with other methods such as those described above.

According to a first aspect of the present invention there is provided an embedment casting composition comprising an acrylic copolymer and a suitable solvent wherein the acrylic copolymer is derived from 80-99.9% w/w methyl methacrylate (MMA), 0.1-10% w/w of a $C_3$-$C_{10}$ olefinically unsaturated acid co-monomer selected from carboxylic, phosphonic, sulphonic or phosphinic acids and 0-10% w/w other suitable monomers and/or additives.

According to a second aspect of the present invention there is provided a process of embedding a specimen in an acrylic polymer matrix comprising the step of:—contacting a specimen to be embedded with an embedment casting composition comprising an acrylic copolymer and a suitable solvent wherein the acrylic copolymer is derived from 80-99.9% w/w methyl methacrylate (MMA), 0.1-10% w/w of an unsaturated acid co-monomer selected from the carboxylic, phosphonic, sulphonic or phosphinic acids and 0-10% w/w other suitable monomers and/or additives, and, preferably, curing the acrylic polymer matrix, more preferably, curing to full polymerisation.

Preferably, the acid is olefinically unsaturated, preferably, α,β-unsaturated. Preferably, the acid has less than 40 atoms, more preferably less than 30 atoms. The acid may be mono, di or polybasic. Typically, the acid is a carboxylic acid.

Typical acids include acrylic acid, methacrylic acid, sorbic acid, crotonic acid, isocrotonic acid, maleic acid, ethyl maleic acid, dimethyl maleic acid, methylene glutaric acid, fumaric acid, ethyl fumaric acid, dimethyl fumaric acid, itaconic acid, itaconic anhydride, dimethyl itaconic acid, gamma-methyl itaconic acid, alpha-methyl itaconic acid, gamma-propyl itaconic acid, gamma-n-hexyl itaconic acid, aconitic acid, citraconic acid, dimethyl citraconic acid, mesaconic acid, transethyl mesaconic acid, dimethyl mesaconic acid, monochloromaleic acid, dichloromaleic acid, hydromuconic acid, glutaconic acid, beta-propyl glutaconic acid, alpha-methyl glutaconic acid (cis and trans), beta-methyl glutaconic acid (cis and trans), hexene-(2)-dicarboxylic acid, hexene-(3)-dicarboxylic acid, beta-carboxyethylacrylate, 2-sulphoethyl methacrylate and various phosphate esters of methacrylic acid, e.g. Sipomer PAM-100 and PAM-200 phosphate functional speciality monomers from Rhodia, cinnamic acid, vinyl faroic acid, alpha-chlorosorbic acid, p-vinylbenzoic acid and atropic acid. Especially preferred are alpha,beta-olefinically unsaturated carboxylic acids including those having from 3 to 8 carbon atoms, more especially preferred are acrylic acid and methacrylic acid.

Preferably, the solvent for the acrylic copolymer in a casting composition slurry comprises 80-100% w/w MMA monomer. Preferably, the solvent contains less than 0.5% w/w, more preferably, less than 0.2% w/w, most preferably, less than 0.05% w/w of total monomer of an unsaturated acid co-monomer selected from the carboxylic, phosphonic, sulphonic or phosphinic acids described herein with respect to the first and/or second aspect and its dependent paragraphs. Typically, the compositions of the present invention have no alternative source of such acid monomers or polymers derived therefrom other than the acrylic copolymer defined herein, wherein, for the avoidance of doubt, no alternative source can be taken to mean less than 0.5% w/w of such acid monomers in the composition in addition to that contributing to the acrylic copolymer, more preferably, less than 0.2% w/w, most preferably, less than 0.05% w/w.

Preferably, the solvent and the copolymer are initially mixed in such a casting composition slurry so as to form an embedment casting slurry. Additionally or alternatively, the solvent and copolymer may be mixed so as to form a specimen coating composition.

Preferably, the acrylic copolymer:solvent mass ratio in the embedment casting composition slurry is in the range 1:5 to 5:1, more preferably, 1:3 to 3:1, most preferably, 1:2 to 2:1.

Preferably, the acrylic copolymer: solvent mass ratio in an embedment casting specimen coating composition is in the range 0.5:99.5 to 70:30, more preferably, 2:98 to 60:40, most preferably, 5:95 to 50:50.

Preferably, the process of the second aspect of the invention includes the step of allowing the composition to thicken sufficiently to support the specimen prior to contact therewith and the contact typically comprises placing the specimen on the surface of the said thickened slurry prior to full polymerisation of the slurry.

Preferably, the process includes the further step of covering the specimen with a further portion of casting composition to thereby embed the specimen in the acrylic casting composition prior to full polymerisation. Preferably, the final cast thereby includes an embedded specimen which is at least partially, preferably, wholly embedded therein. The above described process also includes the possibility of embedding multiple specimens either by placing several specimens on the same layer or covering a preceding specimen with fresh slurry and repeating the embedment process.

The invention also extends to a cast of an embedded specimen wherein the specimen comprises metal in contact with the surrounding cast polymeric matrix and the cast polymeric matrix is derived from a composition according to the first aspect of the present invention.

The acrylic copolymer solvent may be selected from one or more monomers such as $C_1$-$C_{20}$ hydrocarbyl ($C_0$-$C_6$ alk) acrylates, such as the methyl acrylates and methacrylates, and the esters of acrylic, methacrylic and chloroacrylic acids with alcohols and phenols; acrylamide and methacrylamide, acrylonitrile and methacrylonitrile, alkoxyalkyl acrylamides and methacrylamides, e.g. butoxymethyl acrylamide and methoxymethyl methacrylamide, hydroxyalkyl acrylamides and methacrylamides eg. N-methylol acrylamide and methacrylamide; the vinyl aromatic compounds e.g. styrene and substituted derivatives thereof such as the halogenated derivatives thereof and vinyl toluene; the vinyl esters, e.g. vinyl acetate, and vinyl pyrrolidone; maleic anhydride, itaconic acid, N-alkyl (aryl)maleimides, vinyl pyridine, N,N-dialkyl-methacrylamides.

Examples of suitable monofunctional (meth)acrylate monomer solvents include lower alkyl ie. $C_1$ to $C_{20}$ alkyl, (meth)acrylates e.g. methyl(meth)acrylate, ethyl(meth)acrylate, propyl(meth)acrylate, isopropyl(meth)acrylate, n-butyl (meth)acrylate, iso-butyl(meth)acrylate, t-butyl(meth)acrylate, 2-ethyl hexyl(meth)acrylate, octyl(meth)acrylate or dodecyl (meth)acrylate. Additionally, cyclic alkyl monomeric species may be used such as cyclohexyl(meth)acrylate, isobornyl(meth)acrylate and dicyclopentenyl(meth)acrylate. Still further, aryl acrylates such as benzyl(meth)acrylate and phenyl(meth)acrylate. Functional monomers such as methacrylic acid and acrylic acid, hydroxyl or halo alkyl(meth) acrylates such as hydroxy ethyl(meth)acrylate, chloroethyl (meth)acrylate, hydroxypropyl(meth)acrylate and hydroxybutyl (meth)acrylate, glycidyl(meth)acrylate, dialkyl aminoalkyl(meth)acrylates such as dimethyl aminoethyl(meth)acrylate, diethyl aminoethyl(meth)acrylate, dimethyl aminopropyl(meth)acrylate, diethylaminopropyl (meth)acrylate and tertbutyl aminoethyl(meth)acrylate. By (meth)acrylate, we mean that either the methacrylate or the analogous acrylate may be used.

Polyfunctional monomers may also be used as or as part of the monomer solvent. Such have at least two polymerisable double bonds per molecule. Examples of suitable bifunctional monomers include: ethylene glycol di(meth)acrylate, hexanediol di(meth)acrylate, tripropylene glycol di(meth) acrylate, butanediol di(meth)acrylate, neopentyl glycol di(meth)acrylate, diethylene glycol di(meth)acrylate, triethylene glycol di(meth)acrylate, dipropylene glycol di(meth) acrylate, allyl(meth)acrylate, divinyl benzene and substituted analogues thereof. Trifunctional examples include: tripropylene glycol tri(meth)acrylate, trimethylol propane tri(meth) acrylate, pentaerythritol tri(meth)acrylate. Tetrafunctional monomers such as pentaerythritol tetra(meth)acrylate and hexaflinctional monomers e.g. dipentaerythritol hexa(meth) acrylate may also be used. Optionally, the polyfunctional monomer may comprise a mixture of more than one polyfunctional compound.

The final cast polymer may also be formed using in the monomer solvent a reactive oligomer or reactive polymer or pre-polymer having at least two polymerisable double bonds per molecule. Typical reactive oligomers include, but are not limited to, epoxy-(meth)acrylates, polyether (meth)acrylates, polyester-(meth)acrylates and urethane-(meth)acrylates. Typical reactive polymers include addition or condensation polymers such as a styrene or acrylic copolymer containing pendant polymerisable (meth)acrylate groups or unsaturated polyesters.

The amount of polyfunctional monomer solvent present may be up to 50 wt % of the total initial monomer concentration. Preferably, when present, the amount of polyfunctional monomer present is 0.3-25 wt % eg. 0.5-10 wt % based on total initial monomer concentration when the polyfunctional monomer is a simple monomer ie. not a reactive oligomer or polymer. When reactive polymers or oligomers are used then the concentration may vary up to about 50% w/w or greater, example 1-60% w/w total initial monomer.

Vinyl monomers, such as styrenics, acrylates and methacrylates, (meth)acrylamides and acrylonitrile are preferred monomer solvents.

Mixtures of more than one of the aforementioned solvents may be used.

Typically, the monomer solvent includes 80-100% w/w of total monomer of methylmethacrylate with 0-20% w/w of total monomer selected from one or more monomers from the aforementioned lists. A more typical range of such secondary monomers is 0.1-20% w/w, most typically, 0-5-5% w/w of total monomer. Typically, the monomer solvent contributes more than 95%, more typically, more than 99% w/w, most typically, 100% w/w of total monomer added to the acrylic copolymer to make the compositions of the invention. Preferably, the acrylic copolymer and monomer solvent contribute more than 95% w/w, more typically, more than 99% w/w, most typically 100% w/w of the residues in the polymer in the final cured composition.

The casting composition coating solvents may be selected from aliphatic esters, aliphatic ethers, aliphatic ketones and aliphatic alcohols such may be selected from methanol, ethanol, butanol, iso-propanol, n-propanol, acetone, methyl ethyl ketone, methyl isobutyl ketone, diethylketone, 2-heptanone, N-methylpyrrolidinone, diethyl carbonate, methyl acetate, ethyl acetate, n-butyl acetate, isobutyl acetate, 2-hexyl acetate, n-butyl lactate, ethyl lactate, methyl propionate, tetrahydrofuran, dimethyl formamide, N-dimethylacetamide, dichloroethane, dichloromethane, chloroform, ethyl ether, isopropyl ether, toluene, cyclopentanone, cyclohexane, cyclohexanone, ethyl benzene, 1-decanol, 1-methoxy-2-butanol, 1-isopropyl-2-methylimidazole, methyl cellusolve acetate, methylene chloride, nitromethane, methyl formate, gamma-butyrolactone, propylene carbonate, 1,2-dimethoxyethane (glyme), ethyl 3-ethoxypropionate (EEP), xylene, benzene, di-isobutyl carbinol, methyl amyl ketone, hexyl and heptyl acetate, and glycol ethers and glycol esters such as ethylene glycol ether, propylene glycol monoethyl ether acetate, diethylene glycol butyl ether acetate, isobutyl isobutyrate and mixtures of any of the aforesaid solvents in any proportion.

More particularly the coating solvents are selected from methyl methacrylate, acetone, methyl ethyl ketone, ethyl acetate, n-butyl acetate, n-butyl lactate and tetrahydrofuran.

The coating composition typically may also include polymerisable species such as monomers, functionalised oligomers and copolymers as mentioned above for use with the slurry.

Other additives for the compositions and/or the acrylic copolymer include compounds such as cross-linking species, polymers, curing agents, curing promoters and accelerators, colourants, solvents, dispersing aids, lubricants, processing aids, fillers, carrier fluids and toughening agents, plasticizers, flexibilisers, stabilisers, perfumes, initiators and other components as appropriate. Such additives are typically present at less than 20% w/w in the final cured composition, more typically, less than 10% w/w, more preferably, less than 5% w/w.

Suitable free radical initiators include organic peroxides, hydroperoxides, persulphates, peroxyesters and azo compounds. Examples of such initiators are methyl ethyl ketone peroxide, benzoyl peroxide, cumene hydroperoxide, potassium persulphate, azobisisobutyronitrile (AIBN), azobis(2-methylbutyronitrile), azobis(2,4-dimethylvaleronitrile), azobis(4-cyanovaleric acid), tert-butyl peroxyneodecanoate, dibenzoyl peroxide, cumyl peroxide, tert-butyl peroxy-2-ethyl hexanoate, tert-butyl peroxy diethyl acetate and tert-butyl peroxy benzoate, lauroyl peroxide, 2,5-dimethyl-2,5di(t-butylperoxy)hexane, diethyl peroxide, dipropyl peroxide, dilauryl peroxide, dioleyl peroxide, distearyl peroxide, di(tertiary butyl) peroxide, di(tertiary amyl) peroxide, tertiary butyl hydroperoxide, tertiary amyl hydroperoxide, acetyl peroxide, propionyl peroxide, stearoyl peroxide, malonyl peroxide, succinyl peroxide, phthaloyl peroxide, acetyl benzoyl peroxide, propionyl benzoyl peroxide, ascaridole, ammonium persulphate, sodium persulphate, potassium persulphate, sodium percarbonate, potassium percarbonate, sodium perborate, potassium perborate, sodium perphosphate, potassium perphosphate, tetralin hydroperoxide, tertiary butyl diperphthalate, tertiary butyl perbenzoate, 2,4-dichlorobenzoyl peroxide, urea peroxide, caprylyl peroxide, p-chlorobenzoyl peroxide, 2,2-bis(tertiary butyl peroxy)butane, hydroxyheptyl peroxide. However, the addition of initiators is not essential where there is sufficient residual initiator in the acrylic copolymer.

Suitable dispersing aids include chain-like components of polymeric dispersants. Examples of such dispersing aids include acrylate and methacrylate homopolymers and copolymers, polystyrenes, epoxy resins, polyesters and derivatives thereof.

Suitable colourants which may be added to the polymerisable matrix include pigments such as titanium dioxide, carbon black, zinc white, indanthrone, quinacridone, phthalocyanine, iron oxide, titanium oxide and ultramarine blue. Suitably, the pigment may be in particulate form which may be added directly to the polymerizable matrix, such as white bar sand, red brick dust and grey cinder dust. Alternatively, or additionally, the particulate pigment may be mixed with a carrier liquid and then added to the polymerizable matrix. Alternatively, the pigment may be a soluble dye, for example, one soluble in MMA.

Crosslinking species which are suitable for addition to the compositions include crosslinkable monomers such as those carrying at least two polymerizable vinyl groups in the molecule. Suitable copolymerisable cross-linking monomers include difunctional (alk)acrylates and/or trifunctional (alk) acrylates. Examples of such crosslinkable monomers include ethylene glycol di(meth)acrylate, 1,3-butanediol di(meth) acrylate, 1,4-butanediol di(meth)acrylate, polyethylene glycol diacrylate and dimethacrylate, propylene glycol dimethacrylate and diacrylate, glycidyl methacrylate, divinyl benzene, triglycol dimethacrylate or trimethylolpropane tri (meth)acrylate, and allyl compounds such as allyl methacrylate, triallyl cyanurate, and allyl diglycol carbonate.

Suitably, the fillers may be natural mineral filler particles selected from aluminas, silicates, metal aluminates, metal phosphates, metal sulphates, metal carbonates, metal sulphides, metal carbides, metal oxides and combinations thereof. Examples of suitable natural mineral filler particles include nesosilicates (single tetrahedrons); sorosilicates (double tetrahedrons); inosilicates (single and double chains); cyclosilicates (rings); phyllosilicates (sheets) and tectosilicates (frameworks). A further suitable silicate class of minerals is the tectosilicate subclass and includes the feldspar group, the feldspathoid group, the quartz group and the zeolite group. Examples of fillers of the quartz group of the tectosilicate subclass include coesite, cristobalite, quartz and tridymite. Alternatively, suitable synthetic fillers may be used. Such suitable synthetic fillers include glass powder, ceramics, porcelain, cinder, slag and finely divided $SiO_2$.

Suitable curing promoters and accelerators include amines Examples of suitable amines include tertiary amines for example N,N-dimethylamino-para-toluidine, N,N-diethylamino-para-toluidine or N,N-dihydroxyethyl-para-toluidine.

Suitable processing aids for the compositions include polymerized units comprised of one or more ethylenically unsaturated monomers, for example n-alkyl acrylate monomers and n-alkyl methacrylate monomers.

Suitable flexibilising plasticizers for addition to the compositions include polyethylene glycol, polypropylene glycol, polyethylene glycol/propylene glycol copolymers, dimethyl phthalate, dibutyl phthalate, dioctyl phthalate, dinonyl phthalate, dihexyl phthalate, butyl benzyl phthalate, isooctyl benzyl phthalate, citrates such as acetyl tri-n-butyl citrate, adipates such as dialkyl adipates, for example dioctyl adipate, sebacates such as dibutyl sebacate, azelates such as di(2-ethylhexyl) azelate and phosphate esters such as tricresyl phosphate.

Stabilizers which are suitable for the compositions include UV stabilizers. Suitable UV stabilizers include hindered-amine light stabilizers, 2-hydroxy-benzophenones, 2-hydroxyphenylbenzotriazoles, and transition metal complexes such as Ni(II) oxime chelates.

Preferably, the unsaturated acid co-monomers in the acrylic co-polymer are present at a level of 0.2% w/w-10% w/w of the acrylic copolymer prior to its addition to the solvent, more preferably at a level of 0.4-5% w/w, most preferably, 0.6-3% w/w, especially about 0.8 to 3% w/w.

Typically, the acrylic copolymer is produced by a suspension polymerisation process of the type used to make the standard PMMA bead resin for embedment casting applications and known to those skilled in the art.

In a further aspect, the invention also extends to the use of an embedment composition comprising an acrylic copolymer and an acrylic copolymer solvent, the said acrylic copolymer being derived from 80-99.9% w/w methyl methacrylate (MMA), 0.1-10% w/w unsaturated acid co-monomer as defined in the first aspect of the invention and 0-10% w/w other suitable monomers and additives for coating a specimen prior to an embedment casting process.

Still further the invention extends to the use of an embedment composition comprising an acrylic copolymer derived from 80-99.9% w/w methyl methacrylate (MMA), 0.1-10% w/w unsaturated acid co-monomer as defined in the first aspect of the invention and 0-10% w/w other suitable monomers and additives as the copolymer resin component of an embedment slurry in an embedment casting process.

Preferably, the resin is in the form of suitable solid particles of 1-800 microns such as beads, powders, etc.

The specimens for embedment are generally solid or hollow articles. However, liquids can also be embedded usually in the form of ampules. The advantage of the invention is typically found when the specimens for embedment are metallic or hard mineral articles. Typically the specimen is a metal or metal alloy such as those which may be used as specimens for instance, aluminium, copper, brass, bronze, gold, silver, mercury, platinum, steel, iron, nickel, zinc, or galvanised metals of the aforesaid.

Preferably, the weight average molecular weight (Mw) of the acrylic copolymer resin is in the range 50,000 to 4,000,000, more preferably, between the range 100,000 to 2,000,000, most preferably, between the range 200,000 to 1,000,000 Daltons.

A suitable technique for determining weight average molecular weight as defined above is gel permeation chomatography using PMMA molecular weight standards.

Preferably, the viscosity of the casting composition when poured into the mould is in the range 0.1 to 10,000 poise, more preferably, between the range 1 to 5,000 poise, most preferably, between the range 3 to 3,000 poise.

The typical conditions used to perform the embedment casting process are well known to those skilled in the art.

Preferably, the temperature of polymerisation of the casting composition is 30-120° C., more preferably 30-110° C., most preferably, 35-100° C.

Preferred pressures for the casting polymerisation are 1-50 bar, more preferably 2-30 bar, most preferably 3-15 bar.

The coating drying may be carried out at ambient or slightly elevated temperatures, in a range of 10-60° C., more preferably, 15-50° C.

Preferably, coating film thicknesses on the specimen are from 5 microns-500 microns, more preferably 30 microns-300 microns, most preferably, 50 microns-200 microns.

Non-limiting embodiments of the invention will now be defined in the examples.

EXAMPLES

Acrylic Copolymer Preparation

General method for manufacture of poly(methacrylate) bead polymer (weight average molecular weight (Mw) 200,000 to 1,000,000 daltons) for use in casting experiments:

Poly(methacrylate) bead polymer is prepared by a standard suspension polymerisation technique, exemplified as follows:

22.4 kg of deionised water, 176 g of a 3% solution of poly(methacrylic acid) in deionised water and 133 g of disodium phosphate are added to a baffled stainless steel autoclave fitted with variable speed 4 blade agitator and heated to 60° C. whilst purging with nitrogen. 10 kg of monomer and 47 g of pre-dissolved 75% (w/w) dibenzoyl peroxide initiator are added and the mixture is then stirred at 450 rpm and heated to the polymerisation temperature of 90° C. Polymerisation of the monomer droplets ensues on heating. The polymerisation is deemed to be complete after the mixture has undergone the so-called 'Tromsdorff' exotherm whereupon the contents of the autoclave rapidly self-heat to about 95-100° C. The contents are then cooled to below 40° C., filtered, washed with deionised water and dried in an air-circulating oven at 60° C. for several days. The monomer feed contains MMA, unsaturated acid comonomers such as MAA or AA and lubricants such as stearyl alcohol or stearic acid, or plasticisers such as dibutyl phthalate or acetyl tri-n-butyl citrate.

General Method for Determination of Acid Functionality in Poly(methacrylate) Bead Polymers:

Carboxylic and other acid functionality in the bead polymers can be determined using a titration technique as follows;

1 g copolymer resin is dissolved in 45 ml tetrahydrofuran at room temperature overnight. 45 ml denatured ethanol and 1-2 ml phenolphthalein indicator (1% wt in ethanol) are then added and the solution titrated with 0.1N aq. sodium hydroxide solution until the end point is reached (change in solution appearance from colourless to pink). The % wt of unsaturated acid incorporated into the copolymer backbone is then calculated and expressed as either acid number (mgKOH/g resin) or % wt unsaturated acid comonomer.

General Method for Embedment of Metal Tokens in PMMA:

60 g of PMMA bead (co)-polymer are mixed with 40 g of MMA monomer in a plastic beaker at room temperature to form a slurry. (The PMMA bead (co-)polymer typically has a mean particle size of 80 microns, molecular weight 500 k and contains residual peroxide initiator.) When the mixture has thickened to a viscosity that is high enough to prevent the PMMA (co)polymer beads from settling, the slurry is then poured into a plastic mould and allowed to continue to increase in viscosity until the mixture is able to support the weight of a circular metal (e.g., brass or aluminium) token with dimensions 2 mm in thickness and 25 mm in diameter. The metal token (previously degreased by dipping in acetone, then MMA and allowed to dry at room temperature) is placed on top of the PMMA (co)polymer/MMA mixture. An additional portion of slurry is then prepared by mixing 60 g PMMA bead (co-)polymer with 40 g MMA monomer. When viscous enough, the slurry is poured over the metal token and the plastic mould filled, covered and allowed to harden for about 1 hour. The mould is then placed into an autoclave, pressurised with oxygen-free nitrogen gas to 8 bar and heated at 50° C. for 5 hrs and then 90° C. for 1 hr, before allowing to cool to room temperature over 16 hrs. The autoclave pressure is released and the casting de-moulded. The embedded metal token is then examined for signs of discoloration and silvering. The degree of silvering is ranked as follows:

Rank:

0=no silvering (approx 100% of metal bonded to acrylic matrix)

1=slight silvering (75-100% of metal bonded to acrylic matrix)

2=severe silvering (<75% of metal bonded to acrylic matrix)

Comparative Examples 1 to 3

Prevention of Silvering by Addition of Carboxylic Acid-Containing Monomer to the MMA Monomer Used in the Casting Composition or by Coating the Metal Token Before Embedment with Plasticizer 0.5 to 2 parts by w/w (of total monomer) of either methacrylic acid (MAA) or acrylic acid (AA) and 99.5 to 98 parts by w/w MMA monomer were mixed together and used as the monomer portion in casting experiments using standard casting grade PMMA bead polymer.

Table 1 reveals that addition of MAA or AA to the monomer component at a concentration of 2% wt prevents silvering, but it causes a green discolouration of the brass tokens. A lower level of MAA (0.5% wt) does not prevent silvering and still causes a green discolouration of brass tokens.

In a separate experiment (comparative example 4), the tokens were coated with a plasticizer, e.g. acetyl tri-n-butyl citrate, before embedment. However, this approach did not completely prevent silvering.

TABLE 1

| Comparative Example | Experimental conditions | Appearance of aluminium token | Ranking of degree of silvering | Appearance of brass token | Ranking of degree of silvering |
|---|---|---|---|---|---|
| 1 | MMA/MAA 99.5/0.5 % wt casting monomer | — | — | Green discoloration | 2 |
| 2 | MMA/MAA 98/2 % wt casting monomer | No staining | 0 | Green discoloration | 0 |
| 3 | MMA/AA 98/2 % wt casting monomer | No staining | 0 | Green discoloration | 0 |
| 4 | Acetyl tri-n-butyl citrate coating | No staining | 1 | No staining | 1 |

Examples Demonstrating the Invention

The monomer mixtures described in table 2 were used as the monomer feed to make a series of bead polymers varying in carboxylic acid functionality, which were then used as the bead polymer component of the embedment experiment. The embedded metal tokens were then examined for signs of discoloration and silvering. Examples 6-8 and 10-15 demonstrate the invention. Examples 5 and 9 can be considered to be a comparative example.

Key:
MMA=methyl methacrylate
MAA=methacrylic acid
StOH=stearyl alcohol
DOA=dioctyl adipate
DBP=dibutyl phthalate

TABLE 2

| Example | Bead polymer monomer feed composition (% wt) | Amount of MAA in copolymer determined by titration (% wt) | Appearance of aluminium token | Ranking of degree of silvering | Appearance of brass token | Ranking of degree of silvering |
|---|---|---|---|---|---|---|
| 5 comparative | MMA 100 | 0 | No staining | 2 | No staining | 2 |
| 6 | MMA/MAA 99/1 | 0.8 | No staining | 1 | No staining | 1 |
| 7 | MMA/MAA 98/2 | 1.4 | No staining | 0 | No staining | 0 |
| 8 | MMA/MAA 98/2 | 1.4 | No staining | 0 | No staining | 0 |
| 9 comparative | MMA/StOH 96/4 | 0 | No staining | 2 | No staining | 2 |
| 10 | MMA/MAA/StOH 97/2/1 | 1.3 | No staining | 0 | No staining | 0 |
| 11 | MMA/MAA/StOH 94.75/2.25/3 | 1.5 | No staining | 0 | No staining | 0 |
| 12 | MMA/MAA/DOA 95.75/2.25/2 | 1.5 | No staining | 0 | — | — |
| 13 | MMA/MAA/DOA 93.75/2.25/4 | 1.6 | No staining | 0 | — | — |
| 14 | MMA/MAA/DBP 95.75/2.25/2 | 1.5 | No staining | 0 | — | — |
| 15 | MMA/MAA/DBP 93.75/2.25/4 | 1.5 | No staining | 0 | — | — |

As well as using the acid-containing beads in the standard monomer/polymer slurry casting approach described above, another way to prevent silvering has been found to dissolve the acid-containing polymer in MMA monomer or solvent and use the resultant solution to coat the specimen. Allow to dry and then embed the specimen in the normal way with a standard PMMA/MMA slurry or with a PMMA/acid copolymer/MMA slurry.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. An embedment casting composition comprising an acrylic copolymer, a solvent, and an embedded specimen, wherein the embedded specimen is a metallic article and wherein the acrylic copolymer is derived from 80-99.9% w/w methyl methacrylate (MMA), 0.1-10% w/w of an unsaturated acid co-monomer selected from carboxylic, phosphonic, sulphonic or phosphinic acids and 0-10% w/w other monomers and/or additives.

2. A process of embedding a specimen in an acrylic polymer matrix comprising the step of:
    contacting a specimen to be embedded, which is either a metallic or a hard mineral article, with a casting composition, wherein the casting composition has been allowed to thicken sufficiently to support the specimen prior to contact therewith, and wherein the casting composition comprises an acrylic copolymer and a solvent wherein the acrylic copolymer is derived from 80-99.9% w/w methyl methacrylate (MMA), 0.1-10% w/w of an unsaturated acid co-monomer selected from the carboxylic, phosphonic, sulphonic or phosphinic acids and 0-10% w/w other monomers and/or additives.

3. A process comprising embedding a specimen, which is either a metallic or a hard mineral article, in an acrylic copolymer and a solvent, the said acrylic copolymer being derived from 80-99.9% w/w methyl methacrylate (MMA), 0.1-10% w/w unsaturated acid co-monomer as defined in claim 1 and 0-10% w/w other suitable monomers and additives.

4. An embedment casting specimen coating composition comprising a composition as defined in claim 1.

5. A composition, as claimed in claim 1, wherein the acid is olefinically unsaturated.

6. A process comprising casting an embedment casting composition according to claim 1.

7. The composition according to claim 4 wherein, the acrylic copolymer:solvent mass ratio in an embedment casting specimen coating composition is in the range 0.5:99.5 to 70:30.

8. The composition according to claim 1 wherein, the acrylic copolymer:solvent mass ratio in the embedment casting composition in the range 1:5 to 5:1.

9. The composition according to claim 1 wherein, the solvent includes 80-100% w/w of total monomer of methylmethacrylate with 0-20% w/w of total monomer selected from one or more other monomers.

10. The composition according to claim 1 wherein the unsaturated acid co-monomers in the acrylic co-polymer are derived from a level of 0.2% w/w-10% w/w total monomer composition of the acrylic copolymer prior to its addition to the solvent.

11. The composition according to claim 1, wherein, the weight average molecular weight (Mw) of the acrylic copolymer resin is in the range 50,000 to 4,000,000 Daltons.

12. The process of claim 2 wherein, the viscosity of the casting composition is in the range 0.1 to 10,000 poise.

13. The process according to claim 6 wherein, the casting temperature is in the range 30-120° C.

14. The process according to claim 6 wherein the pressure for the casting is 1-50 bar.

15. A cast of an embedded specimen wherein the specimen comprises metal in contact with the surrounding cast polymeric matrix and the cast polymeric matrix is derived from a composition comprising an acrylic copolymer, a solvent and a specimen to be embedded, wherein the acrylic copolymer is derived from 80-99.9% w/w methyl methacrylate (MMA), 0.1-10% w/w of an unsaturated acid co-monomer selected from carboxylic, phosphonic, sulphonic or phosphinic acids and 0-10% w/w other monomers and/or additives.

16. A composition according claim 1 wherein the unsaturated acid co-monomer is selected from the group consisting of acrylic acid, methacrylic acid, sorbic acid, crotonic acid, isocrotonic acid, maleic acid, ethyl maleic acid, dimethyl maleic acid, methylene glutaric acid, fumaric acid, ethyl fumaric acid, dimethyl fumaric acid, itaconic acid, itaconic anhydride, dimethyl itaconic acid, gamma-methyl itaconic acid, alpha-methyl itaconic acid, gamma-propyl itaconic acid, gamma-n-hexyl itaconic acid, aconitic acid, citraconic acid, dimethyl citraconic acid, mesaconic acid, trans-ethyl mesaconic acid, dimethyl mesaconic acid, monochloromaleic acid, dichloromaleic acid, hydromuconic acid, glutaconic acid, beta-propyl glutaconic acid, alpha-methyl glutaconic acid (cis and trans), beta-methyl glutaconic acid (cis and trans), hexene-(2)-dicarboxylic acid, hexene-(3)-dicarboxylic acid, beta-carboxyethylacrylate, 2-sulphoethyl methacrylate and phosphate esters of methacrylic acid, cinnamic acid, vinyl furoic acid, alpha-chlorosorbic acid, p-vinylbenzoic acid and atropic acid.

17. A cast according to claim 15, wherein the cast is clear.

18. The composition according to claim 1 wherein the solvent comprises is selected from the group consisting of a monofunctional (meth)acrylate monomer solvent, a polyfunctional monomer solvent, and mixtures thereof.

19. The composition according to claim 1 wherein the solvent comprises 80-100% w/w MMA monomer.

20. The process according to claim 2 wherein the solvent is selected from the group consisting of a monofunctional (meth)acrylate monomer solvent, a polyfunctional monomer solvent, and mixtures thereof.

21. The process of claim 3, wherein coating film thicknesses on the specimen are from 5 microns to 500 microns.

22. A process of making the composition of claim 1 comprising coating the specimen with the acrylic copolymer and the solvent.

* * * * *